US007173815B2

(12) United States Patent
Lee (10) Patent No.: US 7,173,815 B2
(45) Date of Patent: Feb. 6, 2007

(54) RECEIVING UNIT FOR COMPUTER (75) Inventor: Jong-chan Lee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 10/441,010

(22) Filed: May 20, 2003

(65) Prior Publication Data
US 2003/0235032 A1 Dec. 25, 2003

(30) Foreign Application Priority Data
Jun. 25, 2002 (KR) .............................. 2002-35777

(51) Int. Cl.
G06F 1/16 (2006.01)
(52) U.S. Cl. .................. 361/683; 361/684; 312/333
(58) Field of Classification Search ..................... None
See application file for complete search history.

(56) References Cited

U.S. PATENT DOCUMENTS

| 4,494,806 | A  | * | 1/1985  | Williams et al. ............. 312/333 |
| 5,004,306 | A  | * | 4/1991  | Oshida ..................... 312/319.1 |
| 5,625,533 | A  | * | 4/1997  | Kim et al. .................... 361/681 |
| 6,442,019 | B1 | * | 8/2002  | Lim ............................ 361/683 |
| 6,443,301 | B2 | * | 9/2002  | Garnier ....................... 206/312 |
| 6,848,759 | B2 | * | 2/2005  | Doornbos et al. ......... 312/319.1 |

FOREIGN PATENT DOCUMENTS

| JP | 3041891    | 7/1997  |
| JP | 3062423    | 7/1999  |
| JP | 3067612    | 1/2000  |
| KR | 97-45674   | 7/1997  |
| KR | 20-164588  | 10/1999 |
| KR | 20-167896  | 11/1999 |
| KR | 20-176525  | 1/2000  |
| KR | 20-221920  | 2/2001  |
| KR | 2001-44346 | 6/2001  |
| KR | 2001-74175 | 8/2001  |
| KR | 20-270698  | 3/2002  |
| WO | 02/091151  | 11/2002 |

* cited by examiner

Primary Examiner—Lynn Feild
Assistant Examiner—Anthony Q. Edwards
(74) Attorney, Agent, or Firm—Staas & Halsey LLP

(57) ABSTRACT

A receiving unit for a computer installed to a computer main body has a housing formed with an opening to keep articles therein, and a cassette received in the housing through the opening. The receiving unit includes a hooking part provided in the cassette, and a locking part installed to the housing, capable of moving between a locking position to block the cassette from being drawn in engagement of the hooking part and an unlocking position to allow the cassette to be drawn in disengagement from the hooking part. The receiving unit includes a button part installed to the housing, capable of moving between a pushing position to unlock the locking part and a push releasing position to lock the locking part. The receiving unit also includes a converting part to convert the movement between the pushing position and the push releasing position of the button part into the movement between the locking position and the unlocking position of the locking part, and vice versa. Thus, the present invention provides a receiving unit for a computer, capable of controlling drawing speed of a cassette, thereby increasing reliability on a durability of a locking part of the receiving unit.

14 Claims, 9 Drawing Sheets

RECEIVING UNIT FOR COMPUTER

CROSS-REFERENCE TO RELATED APPLICATION

This application claims the benefit of Korean Application No. 2002-35777, filed Jun. 25, 2002, in the Korean Intellectual Property Office, the disclosure of which is incorporated herein by reference.

BACKGROUND OF THE INVENTION

1. Field of the Invention

The present invention relates to a receiving unit, and more particularly, to a receiving unit for a computer, which is installed to a computer main body.

2. Description of the Related Art

Figure 1:
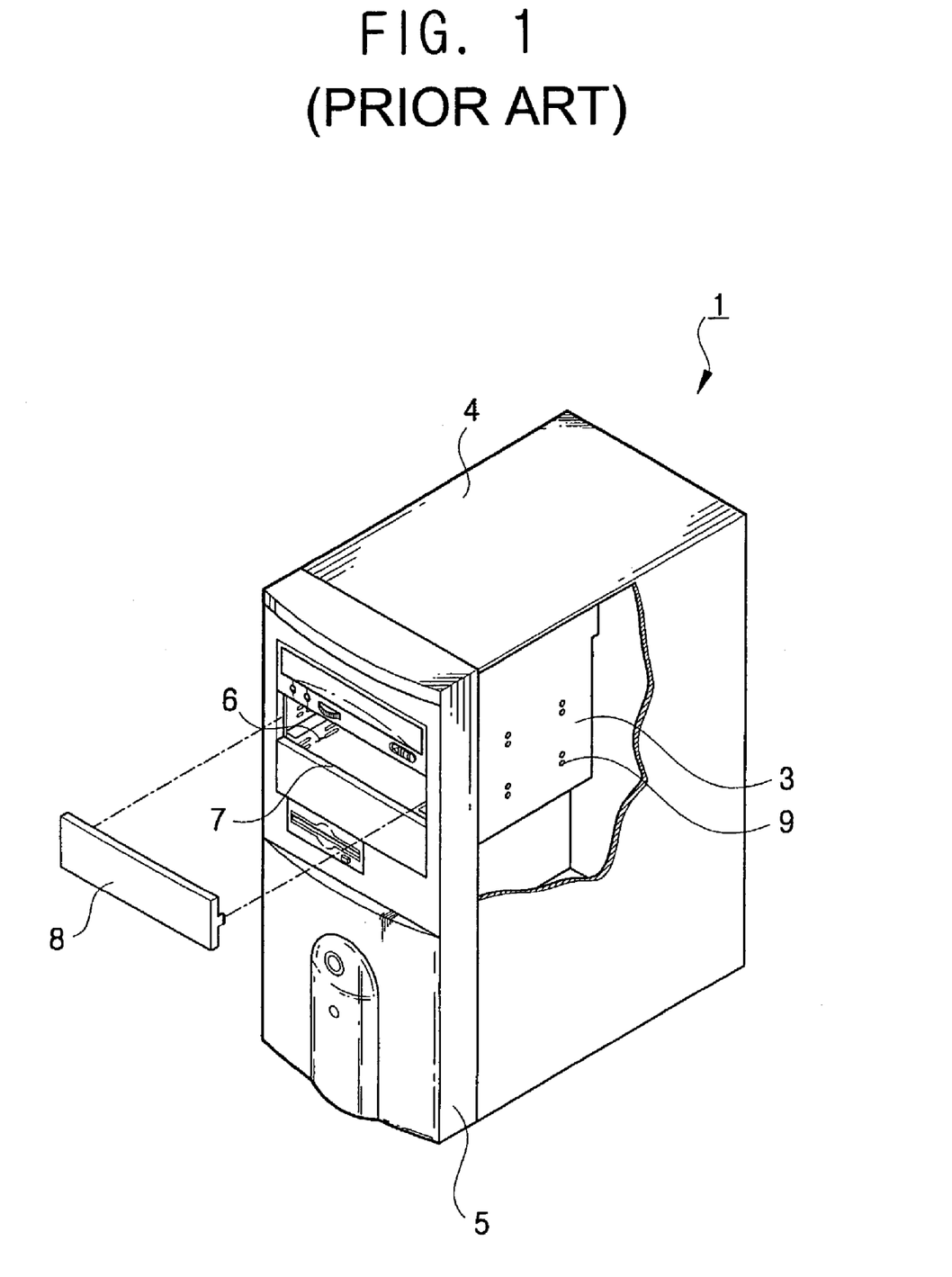
FIG. 1 is a perspective view of a conventional computer main body.

Conventionally, as shown in FIG. 1, a computer body 1 includes a body frame 3 on which hardware components such as a main board, a hard disk drive, etc., are mounted. The computer body 1 also includes an outer casing 4 to cover an outer part of the body frame 3, and to define an external appearance of the computer main body 1. The computer body 1 includes a front casing 5 to define a front shape of the computer main body 1, and formed with an opening 7 through which auxiliary storage units such as a compact disk drive, a floppy disk drive, etc. are exposed from an inside to an outer front face of the main body 1.

A body frame 3 has a space 6 to install a drive to mount an auxiliary storage unit therein (hereinafter referred to as a "bay"). Generally, one or more idle bays 6 are provided in the body frame 3 to allow a user to mount a storage unit, thereby increasing expandability of the auxiliary storage unit. The idle bay 6 is opened toward a front of the computer main body 1 through the opening 7 of the front casing 5. The idle bay 6 is covered with a bay cover 8 to cover the opening 7 of the front casing 5.

The idle bay 6 is advantageous in that it improves the expandability of the auxiliary storage unit, but yet disadvantageous in that it occupies an idle space within the computer main body 1, thereby enlarging overall dimensions of the computer main body 1. To solve the disadvantage, there has been developed a variety of methods to utilize the idle bay 6. For example, a receiving unit to receive items such as compact disks or floppy disks has been proposed.

Figure 2:
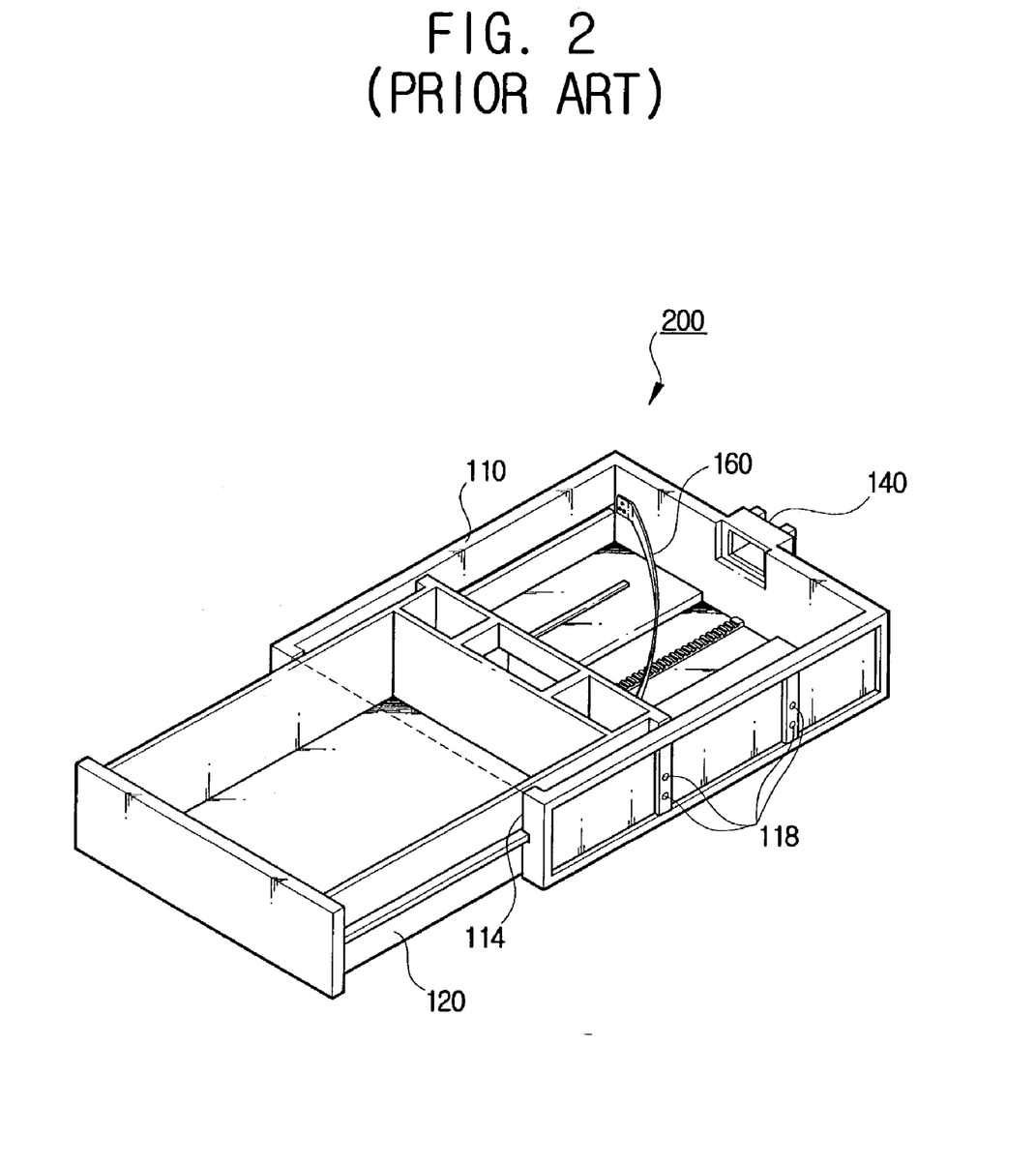
FIG. 2 is an exploded perspective view of a conventional receiving unit for a computer.

As illustrated in FIG. 2, a conventional receiving unit 200 includes a housing 110 installed to a computer body 1, to define an external appearance of the receiving unit 200, and a cassette 120 housed in the housing 110, to receive therein compact disks or floppy disks etc. The receiving unit 200 also includes a plate spring 160 to allow the cassette 120 to be elastically drawn according to a drawing direction, and a locking part 140 to lock the cassette 120 against an elasticity of the plate spring 160 at a position into which the cassette 120 is inserted.

The housing 110 has an approximately rectangular box shape with a hollow inside. The housing is formed with a receiving unit 114 therein in which the cassette 120 is received in a front thereof. On inner parts of both sides of the housing 110 are formed a plurality of screw threads with which screws (not shown) are engaged. The screws are inserted through a plurality of screw-passing holes 9 provided in both side walls of the body frame 3 constituting the bay 6, and through a plurality of screw holes 118 provided at predetermined intervals. The housing 110 is thereby mounted to the computer main body 1 ( see FIG. 1).

The cassette 120 is formed with a receiving space in which compact disks or floppy disks are kept. The front of the cassette 120 covers an opening of the housing 110 when the cassette 120 is inserted into the housing 110.

Between the housing 110 and the cassette 120 the plate spring 160 is provided to allow the cassette 120 to be elastically drawn according to the drawing direction. The cassette 120 is automatically drawn by the elasticity of the plate spring 160 when the cassette 120 is drawn from the housing 110.

Between the housing 110 and the cassette 120 is also installed the locking part 140 of a push-pull type to lock the cassette 120, which overcomes the elasticity of the plate spring 160 when the cassette 120 is received in the housing 110. A locking and unlocking process of the cassette 120 is alternately performed by an external force. If the front of the cassette 120 is pressed to an insertion direction of the cassette 120 when the locking part 140 is locked, the locking part 140 becomes unlocked, thereby allowing the cassette 120 to be automatically drawn from the housing 110 by the elasticity of the plate spring 160.

However, the conventional receiving unit 200 employs the push-pull type locking part 140, which lowers reliability on durability of the conventional receiving unit 200. Further, the conventional receiving unit 200 is inconvenient in that it requires instructions on operating the receiving unit 200 since it is different from a button-push type receiving unit of a compact disk drive that is typically installed on a bay.

Further, a drawing speed of the cassette 120 due to the elasticity of the plate spring 160 cannot be controlled. Thus, the drawing speed becomes different depending on whether articles are received in the cassette 120. More specifically, since the inner part of the cassette 120 is hollow, the receiving unit 200 may have problems because of the drawing of the cassette 120 at a high speed.

SUMMARY OF THE INVENTION

Accordingly, it is an object of the present invention to provide a receiving unit for a computer, capable of controlling a drawing speed of a cassette, thereby increasing reliability on durability of a locking part of a receiving unit.

Additional objects and advantages of the invention will be set forth in part in the description which follows and, in part, will be obvious from the description, or may be learned by practice of the invention.

The foregoing and other objects of the present invention are achieved by providing a receiving unit for a computer installed to a computer main body. The receiving unit has a housing formed with an opening to keep articles therein, and a cassette received in the housing through the opening. The receiving unit includes a hooking part provided in the cassette, and a locking part installed to the housing. The locking part is capable of moving between a locking position to block the cassette from being drawn in engagement of the hooking part, and an unlocking position to allow the cassette to be drawn in disengagement from the hooking part. The receiving unit also includes a button part installed to the housing, and capable of moving between a pushing position to unlock the locking part, and a push releasing position to lock the locking part. The receiving unit includes a converting part to convert the movement between the pushing position and the push releasing position of the button part into the movement between the locking position and the unlocking position of the locking part, and vice versa.

According to an aspect of the invention, the converting part includes a pushing part provided in the button part, a pushed part provided in the locking part, and a first elastic member to supply elasticity to the locking part in a locking direction. An inclination face is formed on at least one of the pushing part and the pushed part, so as to allow the pushed part to press against the pushing part in a push releasing direction by the elasticity of the first elastic member.

According to an aspect of the invention, the converting part further includes a transmission member installed between the pushing part and the pushed part, to convert the movement of the button part into the movement of the locking part and vice versa. The converting part also includes a first inclination face formed on one side of the transmission member and the pushed part, so as to allow the pushed part to press against the one side of the transmission member to a moving direction of the pushing part by the elasticity of the first elastic member. The converting part includes a second inclination face formed on the other side of the transmission member and the pushing part, so as to allow the other side of the transmission member to press against the pushing part by the elasticity of the first elastic member.

According to an aspect of the invention, the converting part further includes a second elastic member installed to the button part, to supply elasticity to the button part in the push releasing position.

According to an aspect of the invention, the converting part includes a pushing part provided in the button part, a pushed part provided in the locking part, a transmission member installed between the pushing part and the pushed part, to convert the movement of the button part into the movement of the locking part, and vice versa. The converting part also includes a first elastic member installed to the locking part, to supply elasticity to the locking part in the unlocking direction, and a second elastic member installed to the button part, to supply elasticity to the button part in the push releasing position. A first inclination face is formed on one side of the transmission member and the pushed part, so as to allow the pushed part to press against the one side of the transmission member by the elasticity of the first elastic member, and a second inclination face is formed on the other side of the transmission member and the pushing part, so as to allow the pushing part to press against the other side of the transmission member by the elasticity of the second elastic member.

According to another aspect of the invention, the receiving unit further includes an elasticity provider installed between the housing and the cassette, to supply elasticity to the cassette in a drawing direction.

According to an aspect of the invention, the elasticity provider includes a spiral spring, having a first side coupled to the housing, so as to supply elasticity to the drawing direction. The elasticity provider also includes a rotation roller rotatably installed to the cassette, in connection to a second side of the spiral spring, to wind or unwind the spiral spring while the cassette is inserted or drawn.

According to an aspect of the invention, the receiving unit includes a damping part installed between the cassette and the housing, to control inserting and drawing speeds of the cassette.

According to an aspect of the invention, the damping part includes a gear rail installed in the housing along the inserting and drawing direction of the cassette, a rotation gear rotated in engagement with the gear rail while the cassette is received, and a damper installed in the cassette, to attenuate the rotation of the rotation gear.

According to yet another aspect of the invention, the receiving unit includes at least one first guide rib formed on the cassette along the inserting and drawing direction of the cassette, and at least one second guide rib slidably installed to the housing, to contact the first guide rib, to guide the cassette to be inserted and drawn.

According to an aspect of the invention, the receiving unit further includes a holder installed on the housing, to supportedly receive the locking part and the button part. The holder is formed with a button protruding opening through which one side of the button part is passed and exposed to an outside.

According to another aspect of the invention, the housing includes a lower case formed with the opening through which the cassette and the button protruding opening is received, and an upper case coupled to the lower case, to thereby form a receiving space therebetween. The housing is provided with a hooking piece extended from one side of the lower case or the upper case toward the other side thereof, and an engagement rib formed on the other side of the lower case or the upper case, being engaged with the hooking piece.

According to an aspect of the invention, the housing further includes a plurality of screw holes at predetermined intervals on sides of the housing, so as to allow the housing to be detachably mounted in a space for idle drives of the computer main body.

According to an aspect of the invention, the articles kept in the cassette include compact disks. The cassette further includes at least one inner cover to receive the disks, in which one side is opened so as to receive the disks therein. The cassette also includes a cover supporter installed in an inside of the cassette, to support one side of the disk receiving inner cover.

BRIEF DESCRIPTION OF THE DRAWINGS

The above and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

For a better understanding of the present invention, it is assumed that the cassette is drawn forward and the cassette is inserted backward. Also, leftward and rightward directions will be referred to based on an insertion direction of the cassette.

Figure 3:
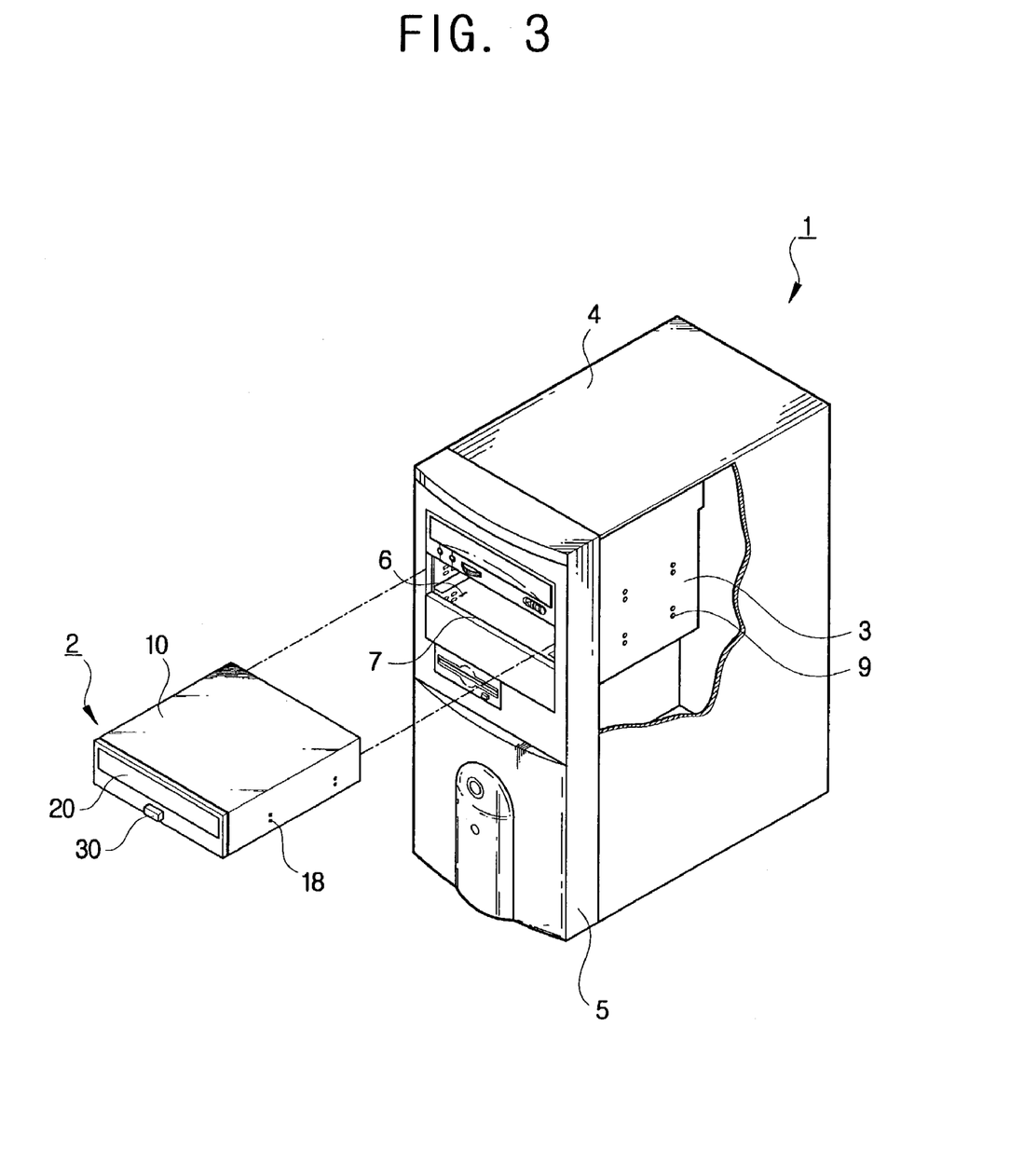
FIG. 3 is a diagram showing a receiving unit mounted to a computer main body, according to an embodiment of the present invention.
Figure 4:
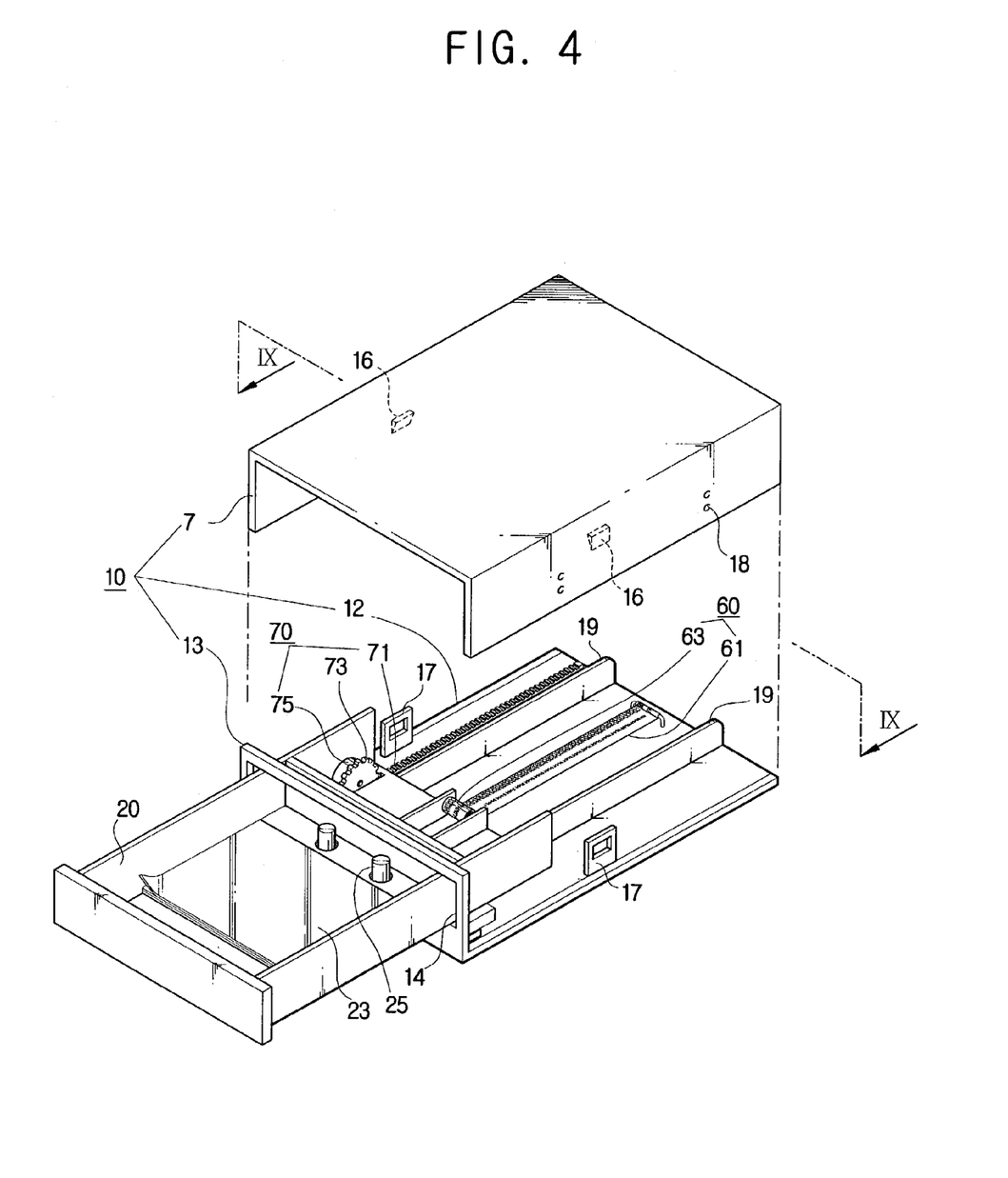
FIG. 4 is an exploded view of the receiving unit as shown in FIG. 3.

FIG. 3 is a diagram showing a receiving unit mounted to a computer main body, according to an embodiment of the present invention. FIG. 4 is an exploded view of the receiving unit as shown in FIG. 3. The receiving unit 2 according to the present invention includes a housing 10 installed to a computer main body 1, formed with an opening 14 in the front thereof, a cassette 20 received in the housing 10 through the opening 14, and a locking part 40 capable of moving between a locking position to prevent the cassette 20 from being drawn, and an unlocking position to allow the cassette 20 to be drawn. The receiving unit also includes a button part 30 capable of moving between a pushing position to unlock the locking part 40, and a push releasing position to lock the locking part 40. The receiving units include converting parts 50, 50a, 50b (see FIGS. 5, 7 and 8) to convert the movement of the button part 30 between the pushing position and the push releasing position into the movement of the locking part 40 between the unlocking position and the locking position, and vice versa.

The housing 10 has a front cover 13 formed with the opening 14. The housing includes a lower case 12 having the locking part 40, the button part 30, the converting parts 50, 50a, 50b, and an upper case 11 coupled to the lower case 12. The upper case 11 and the lower case 12 form a receiving space to allow the cassette 20 to be housed therebetween.

On the front cover 13 is formed an opening 15 through which the button part 30 passes, and is then exposed to an outside of the housing 10. The lower case 12 includes a pair of hooking pieces 16, which are projected toward the upper case 11 from opposite sides of the housing 10. The hooking pieces 16 are engaged with engagement ribs 17 formed on both side walls of the upper case 11.

As shown in FIG. 4, the front cover 13 of the receiving unit 2 is integrally incorporated with the lower case 12. However, the front cover 13 may be integrally incorporated with the upper case 11. Further, the hooking pieces 16 may be provided in the upper case 11, and the engagement ribs 17 may be provided in the lower case 12. Alternatively, the upper case 11 and the lower case 12 may be assembled with screws (not shown) in lieu of the hooking pieces 16 and the engagement ribs 17.

On the opposite sides of the housing 10 are formed screw threads with which screws (not shown) are engaged. The screws (not shown) are inserted into the screw-passing holes 9 provided on both side walls of a body frame 3. The body frame 3 forms a bay 6. The housing 10 also includes a plurality of screw holes 18 provided at predetermined intervals, for installation to the bay 6 of the computer main body 1.

The cassette 20 is provided with a receiving space in which compact disks or floppy disks are kept. The cassette 20 has an approximately rectangular box shape having an upward opening, so as to allow the cassette 20 to be received in the receiving space of the housing 10 through the opening 14 of the housing 10.

The cassette 20 further includes at least one inner cover 23, one end side of which is opened to receive the compact disks, and supporters 25 installed on a back of the cassette 20 to support the disk receiving inner cover 23. Thus, since the compact disks are inserted and kept in the disk receiving inner cover 23, irregular movement of the compact disks is prevented, while the cassette 20 is being inserted into the housing 10, thereby preventing damage to and producing noise from the compact disks.

FIGS. 5 through 8 show other embodiments with regard to the locking part 40, the button part 30 and the converting part 50 of to the present invention. The locking part 40, the button part 30 and the converting part 50 will be described below in detail with reference to FIGS. 5 through 8.

Figure 5:
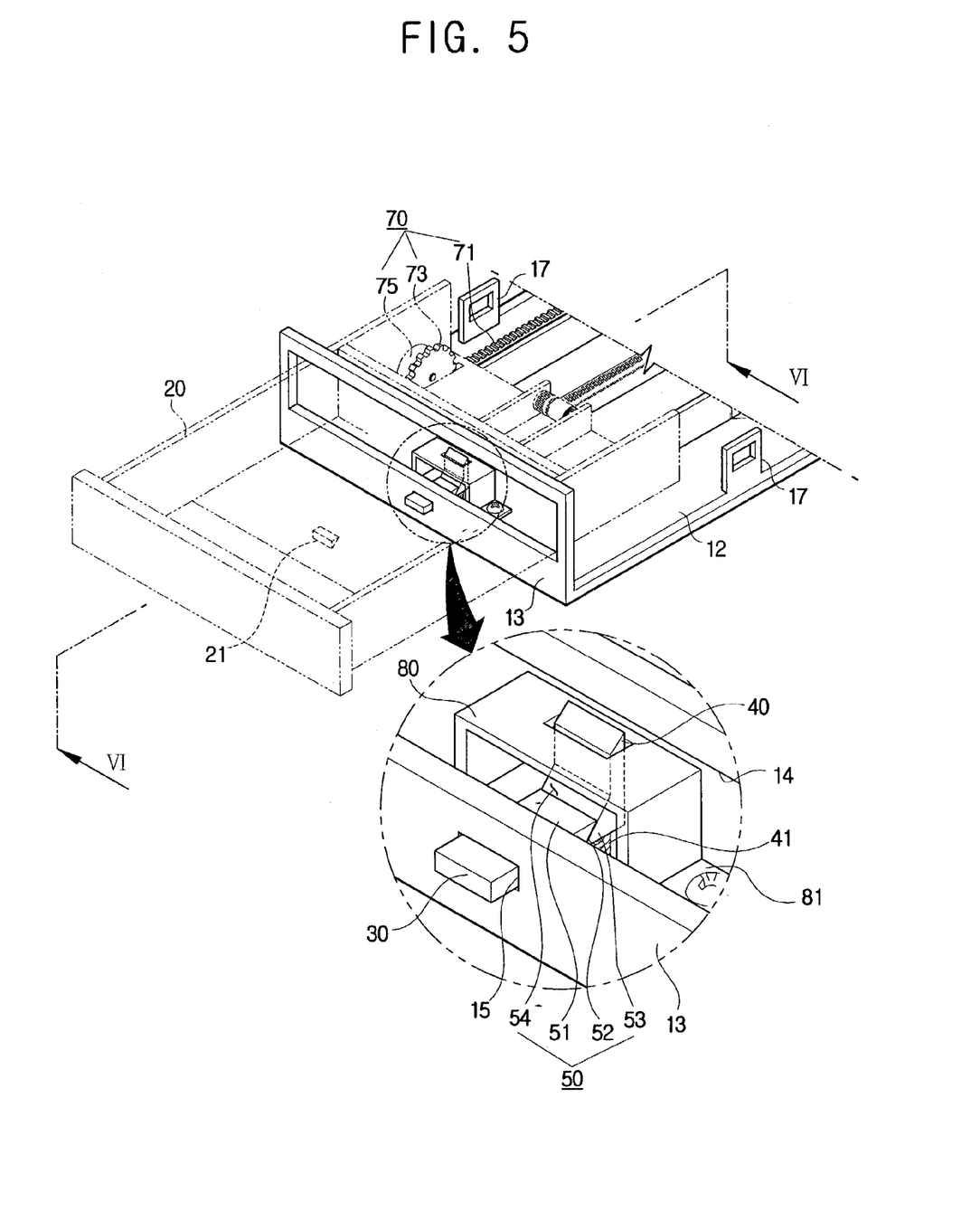
FIG. 5 is a partial perspective view of the receiving unit as shown in FIG. 4.
Figure 6:
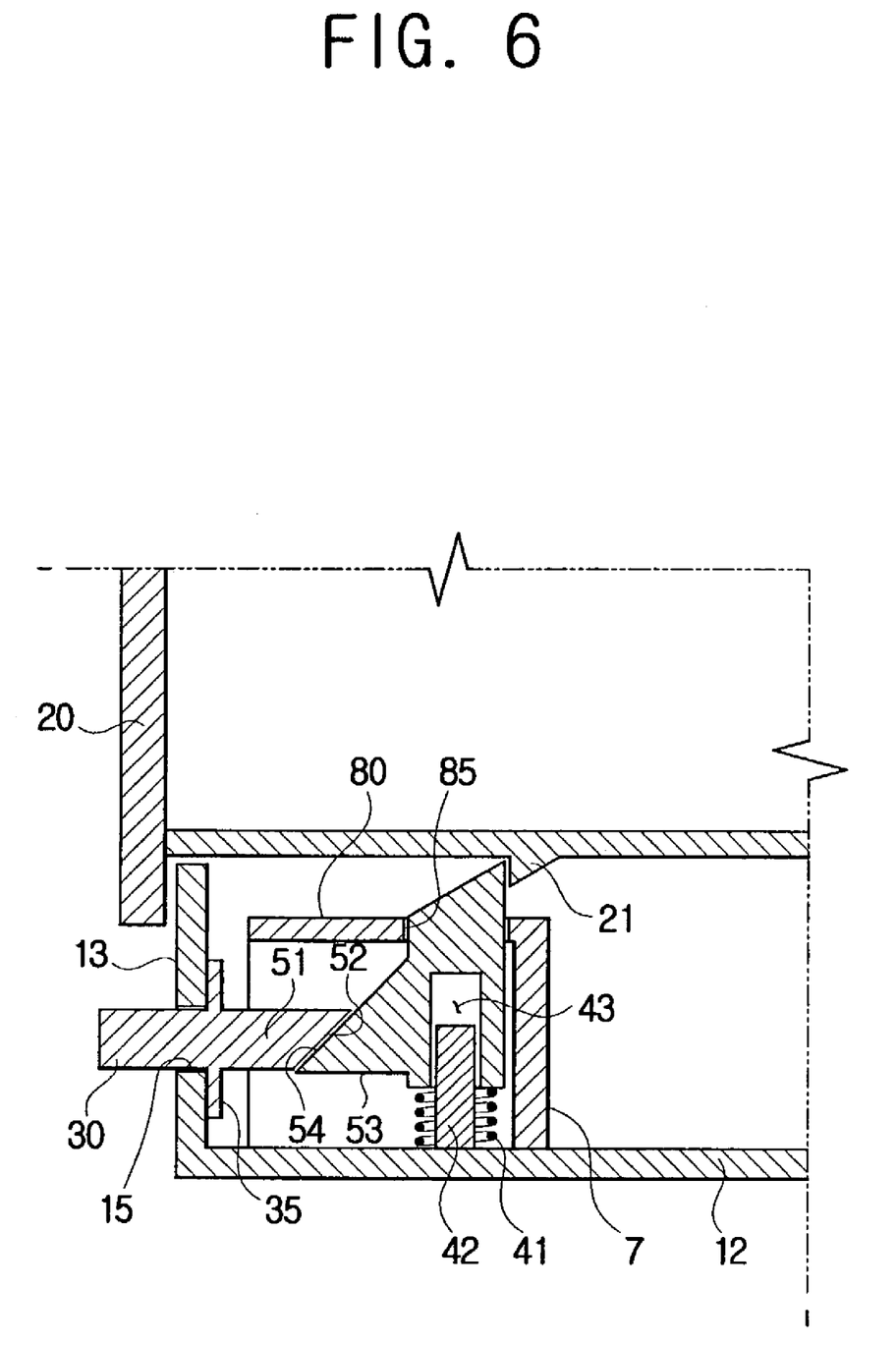
FIG. 6 is a sectional view taken along line VI—VI in FIG. 5.

As shown in FIGS. 5 and 6, the locking part 40 is mounted on the lower case 12 of the housing 10 so as to move between the locking position and the unlocking position, and to engage with a hooking part 21 provided in a lower space of the cassette 20. On a lower end of the locking part 40 is formed a locking guide hole 43 through which a guide rod 42 is inserted, to thereby guide the movement between the locking position and the unlocking position of the locking part 40. The guide rod 42 is upwardly projected from the lower case 12 of the housing 10. Thus, deviation of the locking part 40 from its movement path is prevented while it is being moved between the locking position and the unlocking position.

A front side of the button part 30 is exposed to an outside of the front cover 13 through the opening 15 provided in the front cover 13 of the housing 10. A rear side of the button part 30 is opposite to the locking part 40 within the housing 10. A user may move the locking part 40 to the unlocking position by the converting part 50 (to be described later) while the locking part 40 is moved to the pushing position if the front side of the button part 30 is pushed. On the button part 30 is formed a protrusion 35 to prevent the button part 30 on the push releasing position from being deviated to the outside of the housing 10.

The converting part 50 includes a pushing part 51 provided in the button part 30, a pushed part 53 provided in the locking part 40, and a first elastic member 41 providing elasticity to the locking part 40 in a locking direction of the locking part 40.

The pushing part 51 is provided in the rear side of the button part 30 opposite to the locking part 40, and is formed with an inclination face 52 upwardly inclined along the insertion direction of the cassette 20. The pushed part 53 is formed with an inclination face 54 to contact the inclination face 52. The pushed part 53 presses the pushing part 51 to the push releasing direction by the elasticity of the first elastic member 41 while the locking part 40 is in a locking state.

In light of the configuration described above, a process of keeping articles in the receiving unit 2 according to the present invention will be described below.

If the user pushes the button part 30 exposed to the outside of the front cover 13 of the housing 10, the button part 30 is moved to the pushing position, thereby making the pushing part 51 provided in the button part 30 press against the pushed part 53 provided in the locking part 40. Here, the inclination face 52 of the pushing part 51 is slid and presses the inclination face 54 of the pushed part 53, while the locking part 40 is moved to the unlocking position, to thereby be unlocked from the hooking part 21 provided in the cassette 20. If the locking part 40 is unlocked, the user draws the cassette 20 to its drawing position or the cassette is drawn from the housing 10 by an elasticity provided by an elasticity providing part 60 to be described later.

Conversely, if a force applied to the button part 30 is removed, the locking part 40 is moved to the locking position by the elasticity of the first elastic member 41 applied to the locking part 40 in the locking direction. At the same time, the pushed part 53 provided in the locking part 40 slidingly pushes the pushing part 51 provided in the button part 30 so as to allow the button part 30 to move to the push releasing position. Therefore, when the user moves the cassette 20 to towards the insertion direction again, the locking state is maintained by the elasticity of the first elastic member 41.

In the first embodiment of the present invention, it has been described that the pushing inclination face 52 and the pushed inclination face 54 are respectively provided in the pushing part 51 and the pushed part 53. However, one inclination face may be provided in either of the pushing part 51 and the pushed part 53, thereby converting a motion between the pushing position and the push releasing position of the button part 30 into the movement between the locking position and the unlocking position of the locking part 40, and vice versa.

Figure 7:
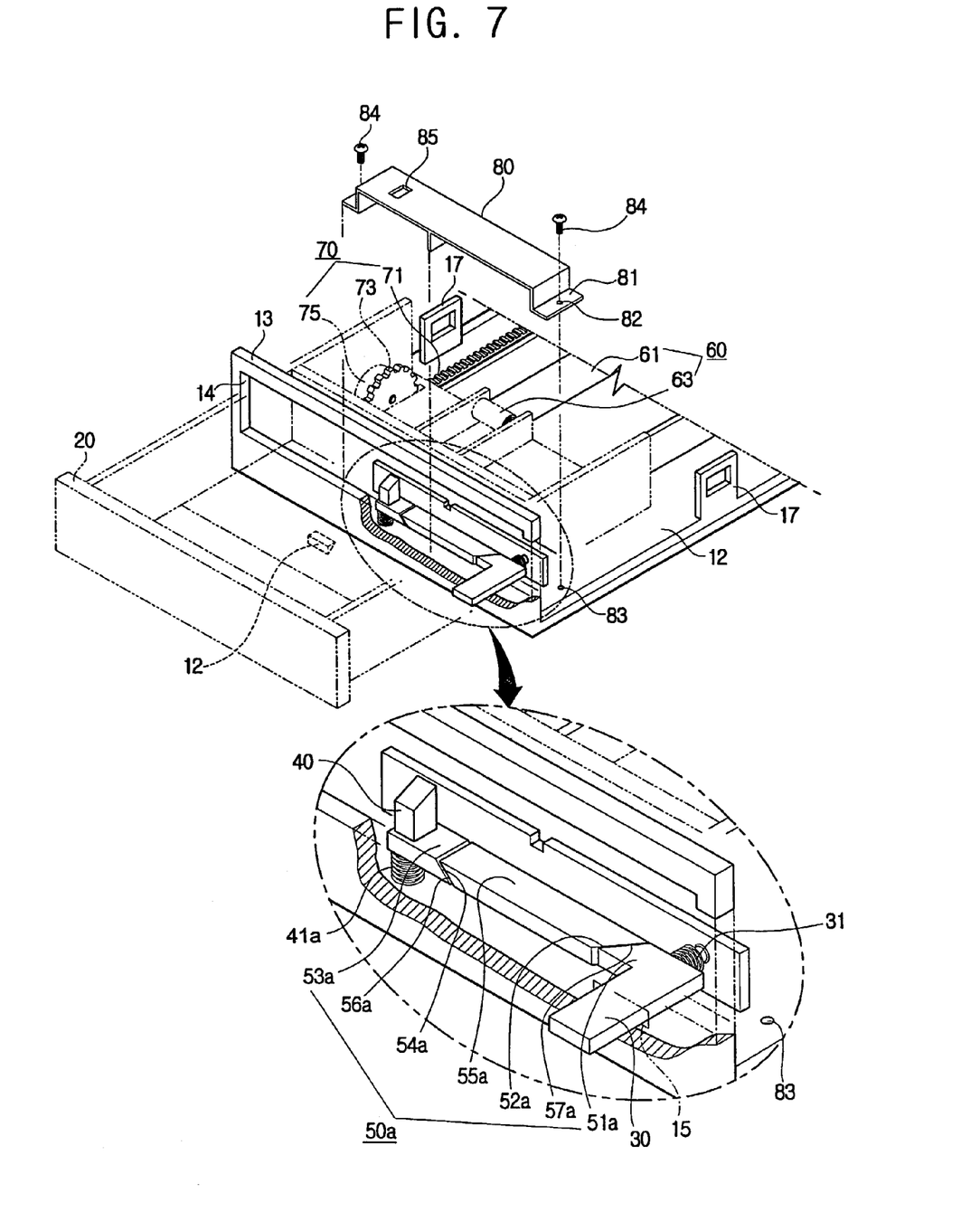
FIG. 7 is a partial perspective view of the receiving unit, according to another embodiment of the present invention.

FIG. 7 is a partial perspective view of the receiving unit, according to another embodiment of the present invention. As shown in FIG. 7, the converting part 50a includes a pushing part 51a provided in the button part 30, a pushed part 53a provided in the locking part 40, a first elastic member 41a providing an elasticity to the locking part 40 in a locking direction, and a transmitting member 55a positioned between the pushing part 51a and the pushed part 53a, to convert a movement between the pushing position and the push releasing position of the button part 30 into a movement between the locking position and the unlocking position of the locking part 40, and vice versa.

On the pushed part 53a is formed a pushed inclination face 54a inclined downwardly along a rightward direction of the insertion direction of the cassette 20 along the unlocking position of the locking part 40. The pushed part 53a presses against a first inclination face 56a rightward along the insertion direction of the cassette 20. The first inclination face 56a is provided at one side end of the transmission member 55a opposite to the pushed inclination face 54a. On the pushed part 51a is formed an inclination face 52a inclined leftward according to the drawing direction of the cassette 20. Thus, a second inclination face 57a presses against the pushing inclination face 52a owing to the elasticity of the first elastic member 41a, which is transmitted from the first inclination face 56a of the transmission member 55a. The second inclination face 57a is provided in the other side end of the transmission member 55a opposite to the pushing inclination face 52a.

In light of the configuration above, a process of keeping articles in the receiving unit 2 is described below.

If the user pushes the button part 30 exposed outside the front cover 13 of the housing 10, the button part 30 is moved to the pushing position, and the pushing inclination face 52a of the pushing part 51a provided in the button part 30 presses against the second inclination face 57a of the transmission member 55a leftward according to the insertion direction of the cassette 20. If the first inclination face 56a of the transmission member 55a slidingly presses against the pushed inclination face 54a of the pushed part 53a due to a force transmitted from the second inclination face 57a of the transmission member 55a, the elasticity of the first elastic member 41 is overcome so as to allow the locking part 40 to move to the unlocking position.

Conversely, if a force applied to the button part 30 is removed, the first elastic member 41a pushes the locking part 40 to the locking position and the elasticity of the first elastic member 41a is transmitted to the button part 30 reversely to the unlocking process as described above, to thereby move the button part 30 to the push releasing position.

A second elastic member 31 may be provided in the button part 30 to supply an elastic force to the button part 30 in the push releasing position. Thus, when the locking part 40 is moved to the locking position from the unlocking position, the elasticity of the second elastic member 31 may be added to the elasticity of the first elastic member 41a, thereby facilitating the movement between the locking position of the locking part 40 and the unlocking position of the button part 30.

Figure 8:
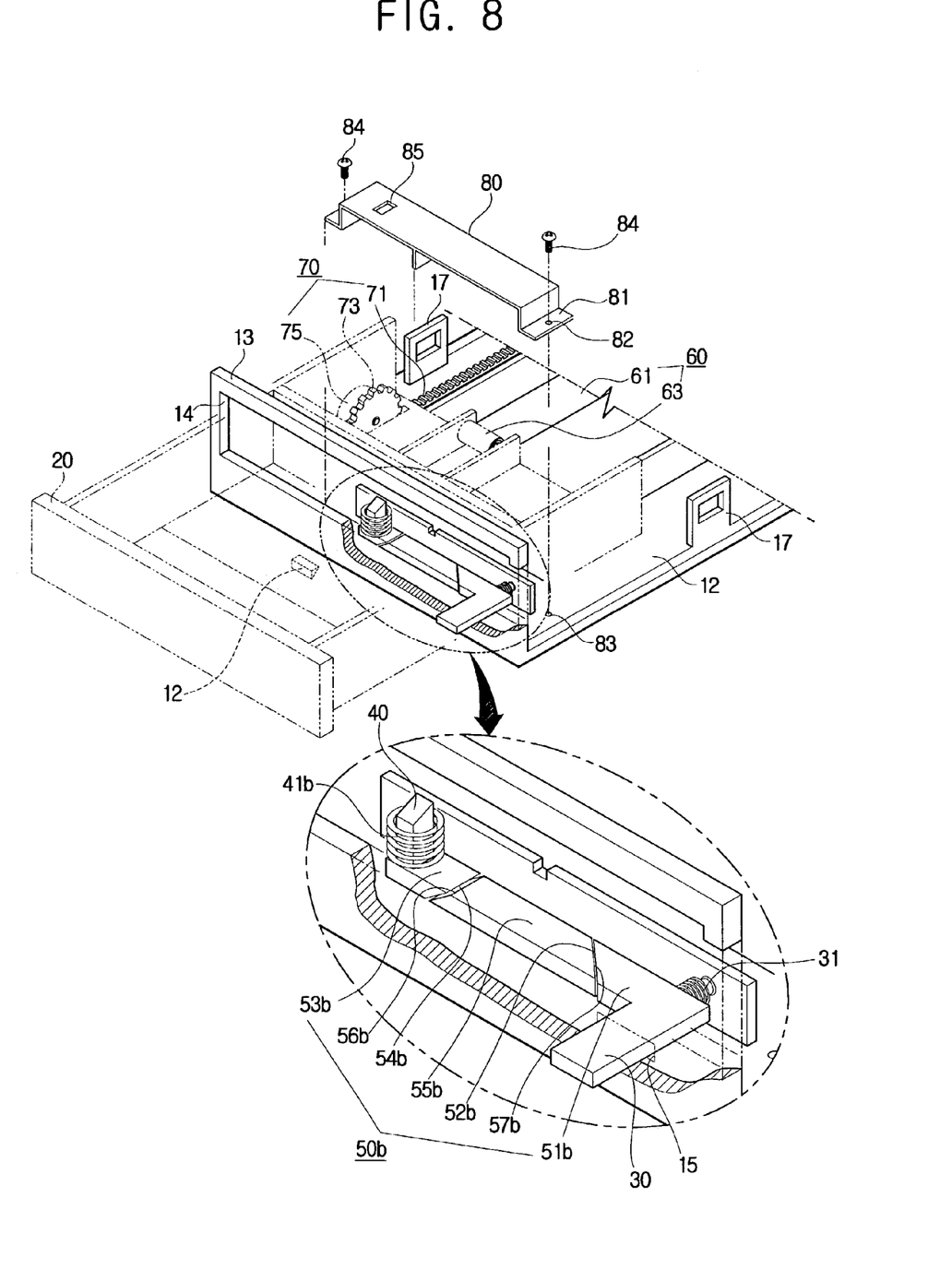
FIG. 8 is a partial perspective view of the receiving unit, according to another embodiment of the present invention.

FIG. 8 is a partial perspective view of the receiving unit according to another embodiment of the present invention. As shown in FIG. 8, the converting part 50b includes a pushing part 51b provided in the button part 30, a pushed part 53b provided in the locking part 40, a transmitting member 55b positioned between the pushing part 51b and the pushed part 53b, to convert the movement between the pushing position and the push releasing position of the button part 30 into the movement between the locking position and the unlocking position of the locking part 40, and vice versa. The converting part 50b also includes a first elastic member 41b installed to the locking part 40, providing elasticity to the locking part 40 in the unlocking position, and a second elastic member 31 installed to the button part 30, to supply elasticity to the button part 30 in the push releasing position.

On the pushed part 53b is formed a pushed inclination face 54b inclined toward the rightward direction relative to the insertion direction of the cassette 20. The pushed part 53b presses against a first inclination face 56b rightward along the insertion direction of the cassette 20. The first inclination face 56b is provided at one side end of the transmission member 55b opposite to the pushed inclination face 54b. On the pushing part 51b is formed an inclination face 52b inclined leftward relative to the inserting direction of the cassette 20. Thus, the pushing part 51b presses against a second inclination face 57b leftward relative to the insertion direction of the cassette 20, owing to the elasticity of the second elastic member 31. The second inclination face 57b is provided in the other side end of the transmission member 55b opposite to the pushing inclination face 52b. Here, the elasticity of the second elastic member 31 is greater than the elasticity of the first elastic member 41b, so that the locking part 40 and the button part 30 maintain the locking position and the push releasing position, respectively, in a normal state.

In light of the configuration above, a process of keeping articles in the receiving unit 2 is described below.

If the user pushes the button part 30, the button part 30 is moved to the pushing position, overcoming the elasticity of the second elastic member 31. At this time, a pressing force applied to the second inclination face 57b of the transmission member 55b by the pushing part 51b due to the elasticity of the second elastic member 31 is removed. Further, the transmission member 55b is capable of being moved rightward relative to the insertion direction of the cassette 20 by the elasticity of the first elastic member 41b applied through the first inclination face 56b of the transmission member 55b. At the same time, the locking part 40 is moved to the unlocking position by the elasticity of the first elastic member 41b.

Conversely, if the force applied to the button part 30 is removed, the button part 30 is moved to the push releasing position by the elasticity of the second elastic member 31. If the pushing part 51b slidingly presses against the second inclination face 57b of the transmission member 55b, the transmission member 55b is moved leftward relative to the insertion direction of the cassette 20. Thus, the first inclination face 56b of the transmission member 55b presses against the pushed part 53b as the transmission member 55b is moved leftward, and the locking part 40 is moved to the locking position, thereby overcoming the elasticity of the first elastic member 41b.

In the above described embodiments of the present invention, it has been described that the first inclination face 56a, 56b and the pushed inclination face 54a, 54b, and the second inclination face 57a, 57b and the pushing inclination face 52a, 52b are respectively provided in the one side end of the transmission member 55a, 55b and the pushed part 53a, 53b, and the other side end of the transmission member 55a, 55b and the pushing part 51a, 51b. However, an inclination face may be provided in either of the one side end of the transmission member 55a, 55b or the pushed part 53a, 53b, and an inclination face may be provided in either of the other side end of the transmission member 55a, 55b or the pushing part 51a, 51b.

It has also been described that the first elastic members 41a and 41b and the second elastic member 31 according to the present invention employ coil springs. However, the first elastic members 41a and 41b, and second elastic member 31 may employ other springs such as plate springs.

Meanwhile, the receiving unit 2 according to the present invention may include a holder 80 installed to the housing 10, to supportedly receive the locking part 40, the button part 30 and the converting part 50 (see FIGS. 5 through 8).

The holder 80 takes a reversed "U" shape to supportedly receive the locking part 40, the button part 30 and the converting part 50. Both ends of the holder 80 are formed with flange parts 81 extendedly bent outside, in which a plurality of screw passing holes 82 are provided. The flange parts 81 are jointed with screws 84 through screw holes 83 provided in the lower case 12 of the housing 10, thereby preventing the locking part 40, the button part 30 and the converting part 50 from being deviated from their moving positions and guiding their respective movements as appropriate. On an upper plane of the holder 80 is formed an opening 85 through which the locking part 40 passes so as to allow the locking part to be engaged with the hooking part 21 provided in the cassette 20.

The receiving unit 2 according to the present invention may include the elasticity supplier 60 installed between the housing 10 and the cassette 20, to supply elasticity to the cassette 20 along the drawing direction of the cassette 20. The elastic supplier 60 includes a spiral spring 61 to supply the elasticity, and a rotation roller 63 rotatably connected to one end side of the spiral spring 61.

The one end side of the spiral spring 61 is fixed to a backward region of the housing 10, and the other end side thereof is connected to the rotation roller 63 rotatably installed in a backward region of the cassette 20. Thus, where the cassette 20 is inserted into the housing 10, the rotation roller 63 is rotated, while winding the other side of the spiral spring 61. At this time, the elasticity to be applied to the cassette 20 in the drawing direction is stored in the spiral spring 61. Therefore, if the locking part 40 is unlocked in the insertion direction of the cassette 20, the rotation roller 63 is rotated, while unwinding the other side of the spiral spring 61, thereby automatically drawing the cassette 20 out of the housing 10.

In the present invention, the elasticity supplier 60 includes the spiral spring 61 and the rotation roller 63. However, other elastic members such as a plate spring, an extension spring, and so on may be employed to supply elasticity to the cassette 20 in the drawing direction.

Figure 9:
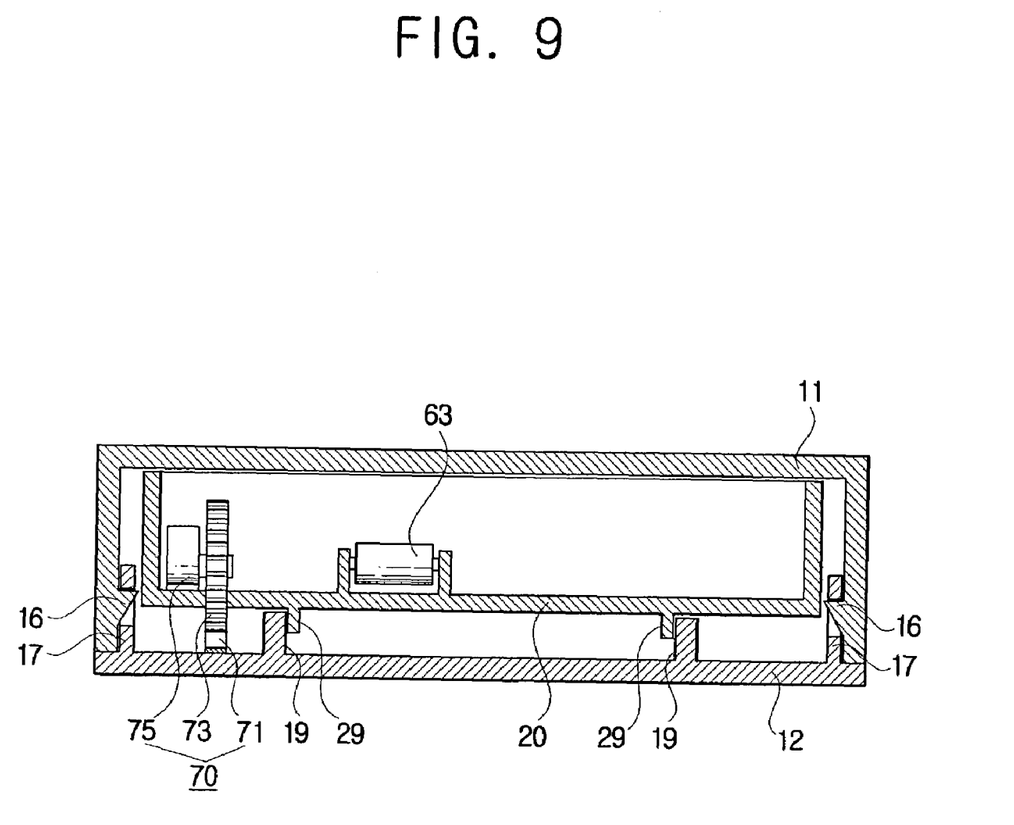
FIG. 9 is a sectional view taken along line IX—IX in FIG. 4.

Referring to FIG. 9, the receiving unit 2 according to the present invention is includes a damping part 70 installed between the cassette 20 and the housing 10, to control the inserting and drawing speeds of the cassette 20.

The damping portion 70 is, as shown in FIG. 9, installed to the lower case 12 of the housing 10 according to the inserting and drawing direction of the cassette 20. The damping portion 70 includes a gear rail 71 (see FIG. 5), a rotation gear 73 engaged with the gear rail 71 in the cassette 20, and a damper 75 installed behind the cassette 20, to attenuate a rotation force of the rotation gear 73.

The rotation gear 73 is rotated in engagement with the gear rail 71 when the cassette 20 is drawn or inserted. At this time, the rotation of the rotation gear 73 is attenuated by a damping device such as a spring, a viscous fluid, a magnet, etc., in an inside of the rotation damper 75 coaxially connected with the rotation gear 73, thereby being able to prevent the high-speed drawing and insertion of the cassette 20. Here, the rotation damper 75 may be fixed to a plane of the cassette 20 by screws (not shown).

The receiving unit 2 according to the present invention may further include a pair of first guide ribs 19 upwardly projecting from the lower case 12 of the housing 10 and being formed along the insertion direction of the cassette 20. The receiving unit 2 includes a pair of second guide ribs 29 formed opposite to the first guide ribs 19 on the bottom plate of the cassette 20. Thus, the first guide ribs 19 provided in the housing 10 guide a sliding of the second guide ribs 29 provided in the cassette 20 during the insertion and drawing of the cassette 20, thereby preventing the cassette 20 from being laterally shaken relative to the insertion and drawing direction of the cassette 20 within the housing 10.

According to the present invention, there has been provided the locking part 40 installed to the housing 10, the button part 30 to unlock the locking part 40, and the converting part 50 to convert the movement of the locking part 40 into the movement of the button part 30, and vice versa, so that the receiving unit 2 of the present invention is increasingly reliable on its durability, the drawing speed of the cassette 20 is controlled, and it may be unlocked by use of a button pushing method.

As described above, the receiving unit according to the present invention is advantageous in that it is highly reliable on its durability, and it employs a button pushing method capable of preventing a high-speed drawing thereof.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A receiving unit for a computer installed to a computer main body, having a housing formed with an opening to keep articles therein, and a cassette received in the housing through the opening, comprising:

a hooking part provided in the cassette;

a locking part installed to the housing, movable between a locking position to block the cassette from being drawn in engagement of the hooking part, and an unlocking position to allow the cassette to be drawn in disengagement from the hooking part;

a button part installed to the housing, movable between a pushing position to unlock the locking part, and a push releasing position to lock the locking part; and a converting part to convert the movement between the pushing position and the push releasing position of the button part into the movement between the locking position and the unlocking position of the locking part, and vice versa, wherein the converting part comprises:

a pushing part provided in the button part, a pushed part provided in the locking part, and a first elastic member to supply elasticity to the locking part in a locking direction, and an inclination face formed on at least one of the pushing part and the pushed part, so as to allow the pushed part to press against the pushing part in the push releasing direction by the elasticity of the first elastic member.

2. The receiving unit according to claim 1, further comprising:

an elasticity provider installed between the housing and the cassette, to supply elasticity to the cassette in a drawing direction.

3. The receiving unit according to claim 2, wherein the elasticity provider includes:

a spiral spring, having a first side coupled to the housing, so as to supply elasticity in the drawing direction; and a rotation roller rotatably installed to the cassette, in connection to a second side of the spiral spring, to wind or unwind the spiral spring while the cassette is inserted or drawn.

4. The receiving unit according to claim 2, further comprising:

a damping part installed between the cassette and the housing, to control inserting and drawing speeds of the cassette.

5. The receiving unit according to claim 4, wherein the damping part includes:

a gear rail installed in the housing along an inserting and drawing direction of the cassette;

a rotation gear rotated in engagement with the gear rail while the cassette is received; and a damper installed in the cassette, to attenuate the rotation of the rotation gear.

6. The receiving unit according to claim 4, further comprising:

at least one first guide rib formed on the cassette along the inserting and drawing direction of the cassette; and at least one second guide rib slidably installed to the housing, to contact the first guide rib, to guide the cassette to be inserted and drawn, thereby preventing the cassette from shaking relative to the inserting and drawing direction.

7. The receiving unit according to claim 4, wherein the housing comprises:

a lower case formed with the opening through which the cassette is received and the button protruding opening, and an upper case coupled to the lower case, to thereby form a receiving space therebetween;

a hooking piece extended from one side of the lower case or the upper case toward the other side thereof; and an engagement rib formed on the other side of the lower case or the upper case, to be engaged with the hooking piece.

8. The receiving unit according to claim 4, wherein the housing further comprises:

a plurality of screw holes at predetermined intervals provided on sides of the housing, so as to allow the housing to be detachably mounted in a space for idle drives of the computer main body.

9. The receiving unit according to claim 4, wherein the articles kept in the cassette include compact disks, and the cassette further comprises:

at least one inner cover to receive the disks, one side of which is opened so as to receive the compact disks therein, and a cover supporter installed on an inside of the cassette, to support the other side of the disk receiving inner cover.

10. The receiving unit according to claim 1, wherein the locking part has a locking guide hole through which a guide rod is inserted at a lower end of the locking part, to thereby guide the movement between the locking position and the unlocking position of the locking part.

11. The receiving unit according to claim 1, wherein the button part is provided with a protrusion to prevent the button part, on the push releasing position, from being deviated to an outside of the housing.

12. The receiving unit according to claim 1, wherein the button part is moved to the pushing position to unlock the locking part, so as to allow the cassette to be drawn from the housing.

13. The receiving unit according to claim 1, wherein the button part is moved to the push releasing position to lock the locking part, so as to allow the cassette to be inserted to the housing.

14. A receiving unit for a computer installed to a computer main body, having a housing formed with an opening to keep articles therein, and a cassette received in the housing through the opening, comprising:

a hooking part provided in the cassette;

a locking part installed to the housing;

a button part installed to the housing, to unlock the locking part; and a converting part to convert the movement of the locking part into the movement of the button part, and vice versa, thereby controlling a drawing speed of the cassette, wherein the locking part moves between a locking position to block the cassette from being drawn in engagement of the hooking part, and an unlocking position to allow the cassette to be drawn in disengagement from the hooking part, the button part moves between a pushing position to unlock the locking part, and a push releasing position to lock the locking part, and the converting part comprises:

a pushing part provided in the button part, a pushed part provided in the locking part, and a first elastic member to supply elasticity to the locking part in a locking direction, and an inclination face formed on at least one of the pushing part and the pushed part, so as to allow the pushed part to press against the pushing part in the push releasing direction by the elasticity of the first elastic member.

* * * * *